W. J. MOW.
BRAKE FOR UPHAULS FOR MINES.
APPLICATION FILED MAY 18, 1917. RENEWED JAN. 15, 1918.
1,274,071.
Patented July 30, 1918.
2 SHEETS—SHEET 1.
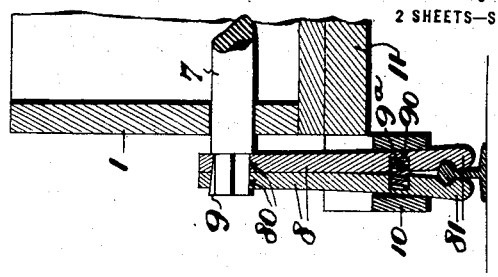
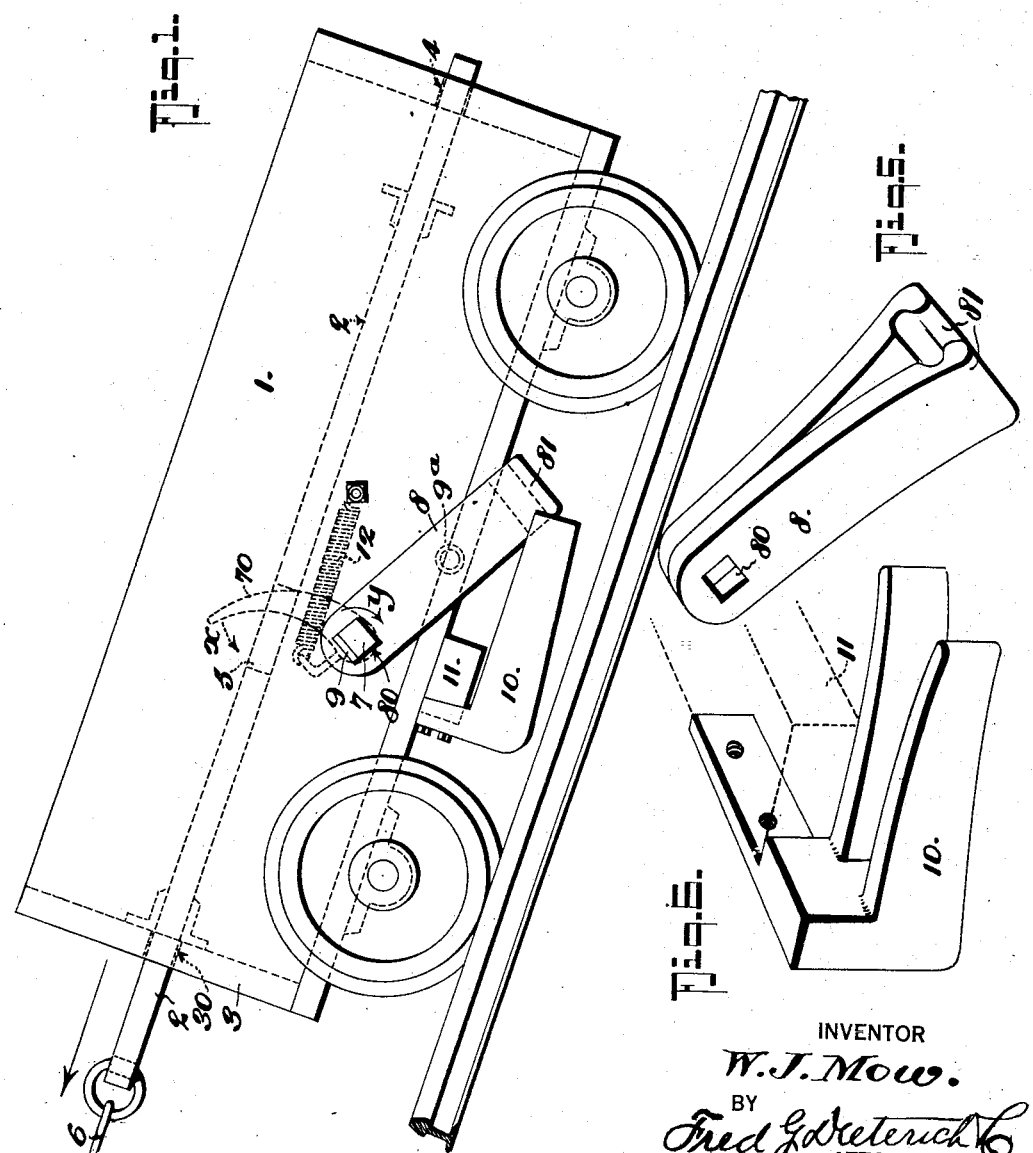
INVENTOR
W. J. Mow.
BY
Fred G. Dieterich
ATTORNEYS

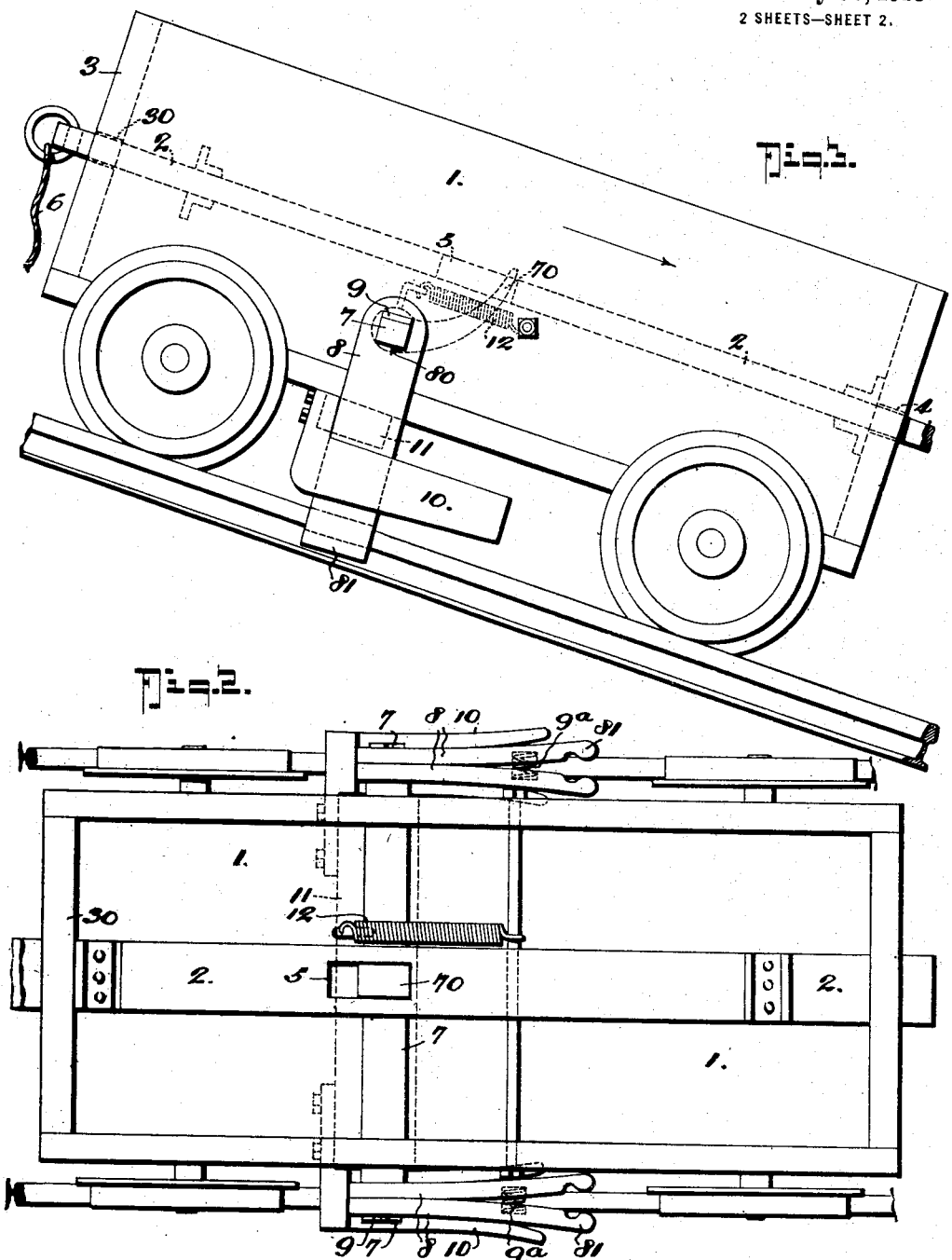

ized apertures 80—80 to adapt them for
UNITED STATES PATENT OFFICE.

WILLIAM J. MOW, OF GRASS VALLEY, CALIFORNIA.

BRAKE FOR UPHAULS FOR MINES.

1,274,071. Specification of Letters Patent. Patented July 30, 1918.

Application filed May 18, 1917, Serial No. 169,555. Renewed January 15, 1918. Serial No. 211,997.

*To all whom it may concern:*

Be it known that I, WILLIAM J. MOW, a citizen of the United States, residing at Grass Valley, in the county of Nevada and State of California, have invented a new and useful Brake for Uphauls for Mines, of which the following is a specification.

This invention has reference to certain improvements in brake mechanism for uphaul cars and my said invention primarily has for its purpose to provide a safety hold back device that automatically becomes effective as the pull cable breaks, or the car for any reason gravitates toward the bottom of the inclined trackway.

As is well known in the use of uphaul mining cars, there is continual danger of the uphaul cable or chain breaking with the result that the car will race or plunge to the bottom of the shaft and often with great loss and damage to property and frequent loss of life.

Among other objects my invention seeks to provide, in a safety mechanism for uphauls, a coöperative arrangement of parts including brake jaws having gripping members especially designed for clamping the head or tread portion of the rails combined with a means that tend to instantly move the said gripping members into a braking condition when the cable separates or the car freely gravitates down the incline, whereby to hold the said car locked on the said track rails against further downward movement.

My invention also includes an improved means which operate to automatically release or throw out the rail gripping members and cause them to resume their normal condition so soon as the pull cable or chain is repaired and the car is again caused to travel up the said incline.

With other objects in view, my invention consists in the peculiar features of construction and novel combination of the parts hereinafter fully explained, specifically pointed out in the appended claims and illustrated in the accompanying drawings, in which:

Figure 1 is a side elevation of an uphaul or mining car with which my improvements are operatively connected, the brake or safety device being shown at the normal position and the car indicated as free for being uphauled.

Fig. 2 is a top plan view of the car and the attached brake or safety device, the parts being positioned as in Fig. 1.

Fig. 3 is a side view of the car, the same being indicated as gravitating down the inclined track and the pull cable or chain as broken.

Fig. 4 is a tranverse section of the car and the trackway on which it is mounted, the parts being positioned as in Fig. 3.

Fig. 5 is a detail perspective view of one of the brake or safety devices hereinafter specifically referred to.

Fig. 6 is a detail perspective of the forked member for automatically closing the spring clutch jaws.

In the drawings, 1 designates the ordinary type of uphaul or mine car which, when constructed with my improved devices, includes a longitudinally extended pull bar 2, the forward end of which is guided by moving through a slot 30 in a front or cross member 3 fixedly attached to the car body and at the rear by riding through a slot 4 in the back end of the car, and the said bar 2, at a suitable point, has a longitudinal slot 5, the purpose of which will presently appear.

6 designates the uphaul cable or chain which attaches to the front or upper end of the pull bar 2, as shown.

7 indicates a cross shaft or axle and the said shaft or axle is rockably mounted in the opposite sides of the car and has its opposite ends projected beyond the said car sides for receiving the clutch or brake members 8—8, the peculiar construction of which is shown in detail in Fig. 5, from which it will be observed that the clutch or dog is formed of two pieces of spring steel, the upper ends of which having alining elongated apertures 80—80 to adapt them for being readily slid onto the projecting ends of the rock axle 7 to which they are clamped by wedge locks 9, as shown.

The lower ends of the two steel pieces that constitute the clutch or dog 8 are normally spread apart by a stout coil spring 9ª held at its ends in the sockets 90—90 in the opposing faces of the said clutch members 8—8, the lower ends of which are rounded to form concaved gripping jaws 81—81 for closing over and gripping the head of the rail as will be presently further explained.

70 designates a crank member that is fixedly attached to the rock shaft 7 and which, under normal conditions, that is when the uphaul cable is pulling the car up the inclined trackway, projects in the longitudinal slot 5 and is engaged by the pull bar 2 which forces the crank member 70 in the direction of the arrow $x$ and thereby correspondingly rocks the axle 7, swings and holds the clutch or dog 8 to the elevated or inoperative position, see Fig. 1, so long as the pull strain is on the bar 2.

Coöperative with the clutch or dog 8 is a wedge guide that consists of a forked horizontal metal arm 10, the forward end of which is fixedly connected, in any suitable manner, to an adjacent end of a cross timber 11 which extends across and is secured to the under edges of the sides of the car and the said arm is projected toward the rear end of the car in a plane substantially parallel with the adjacent side of the car, see Fig. 2 from which and Figs. 5 and 6 it will be seen that the clamping sections of the clutch member, as the latter is swung down to the clutching position, engages the inner or wedging face of the said arm 10 and by reason thereof, it follows that, as the said clutch is swung down to engage with the rail, the jaws 81, as they are crowded over the rounded edges of the rail head are caused to engage the said rail head with a monkey wrench grip.

12 designates a strong coil spring that is connected at one end to the rear end of the car and at the other end to the rock axle 7 and the said spring tends to normally rock the axle in the direction indicated by the arrow $y$, it being apparent from the drawings that so soon as the uphaul cable or chain parts or the car gets away from the uphauls and begins to gravitate backward and pull tension on the bar is off, the tension of the spring 12 instantly rocks the axle and swings the clutch or dog 8 down into engagement with the track rail until it assumes the position indicated in Fig. 2, the forward end of the arm 10 before referred to, forming a stop to prevent the clutch from lifting the car off the track.

What I claim is:

1. A brake device for uphaul cars comprising a pivoted rail gripper, a draw bar controlled means for holding the gripper inactive when the draw bar is under a pull strain, means tending to move said gripper into the rail gripping position, and a device coöperating with the gripper when in the gripping position to cause the said gripper to effectually grip the rail.

2. A brake device for uphaul cars comprising a pivoted rail gripper, a draw bar controlled means for holding the gripper inactive when the draw bar is under a pull strain, means tending to move said gripper into the rail gripping position, and a device coöperating with the gripper when in the gripping position to cause the said gripper to effectually grip the rail, said gripper comprising a bifurcated member and a spreader normally holding the said member apart, the said device being designed to close the gripper members together.

3. A brake device for uphaul cars comprising a pivoted rail gripper, a draw bar controlled means for holding the gripper inactive when the draw bar is under a pull strain, means tending to move said gripper into the rail gripping position, and a device coöperating with the gripper when in the gripping position to cause the said gripper to effectually grip the rail, said gripper comprising a bifurcated member and a spreader normally holding the said member apart, the said device being designed to close the gripper member together, said gripper members having rail head engaging grooves.

4. A brake device for uphaul cars, comprising an axle rockably mounted on and transversely of the car, a rail clutch dog mounted on the axle, means tending to normally move the dog to engage with the rail, a draw bar mounted on and having a limited pull movement relative to the axle, a connection between the draw bar and the axle that holds the axle and the clutch dog out of engagement with the rail.

5. A brake device for uphaul cars, comprising an axle rockably mounted on and transversely of the car, a rail clutch dog mounted on the axle, means tending to normally move the dog to engage with the rail, a draw bar mounted on and having a limited pull movement relative to the axle, a connection between the draw bar and the axle that holds the axle and the clutch dog out of engagement with the rail, said clutch dog including opposing jaws, means tending to hold the jaws apart and other means coöperating with the said jaws when the dog is moved to its rail clutching position for clamping the jaws on the rail.

6. A brake device for uphaul cars, comprising an axle rockably mounted on and transversely of the car, a rail clutch dog mounted on the axle, means tending to normally move the dog to engage with the rail, a draw bar mounted on and having a limited pull movement relative to the axle, a connection between the draw bar and the axle that holds the axle and the clutch dog out of engagement with the rail, said clutch dog including opposing jaws, means tending to hold the jaws apart and other means coöperating with the said jaws when the dog is moved to its rail clutching position for clamping the jaws on the rail, the said means consisting of a fixedly held wedge guide.

7. A brake device for uphaul cars, comprising an axle rockably mounted on and transversely of the car, a rail clutch dog mounted on the axle, means tending to normally move the dog to engage with the rail, a draw bar mounted on and having a limited pull movement relative to the axle, a connection between the draw bar and the axle that holds the axle and the clutch dog out of engagement with the rail, said clutch dog including opposing jaws, means tending to hold the jaws apart and other means coöperating with the said jaws, when the dog is moved to its rail clutching position, for clamping the jaws on the rail, the said means consisting of a fixedly held wedge guide, the said wedge guide including a stop portion for limiting the movement of the dog to its rail clutch position.

WILLIAM J. MOW.

Copies of this patent may be obtained for five cents each, by addressing the "Commissioner of Patents, Washington, D. C."